Nov. 11, 1952                A. A. SORENSON                2,617,332
                       HOBBING ATTACHMENT FOR LATHES
Filed Nov. 19, 1947                                   3 Sheets-Sheet 1
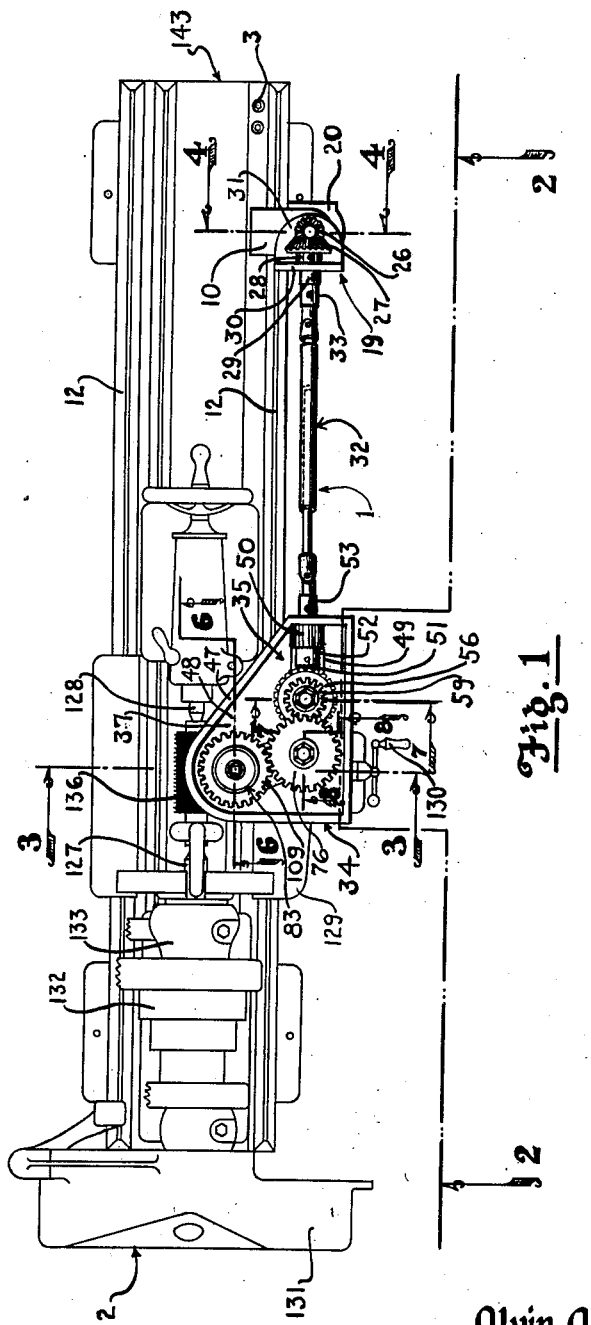
INVENTOR.
Alvin A. Sorenson
BY Lester B. Clark
   Ray L. Smith
ATTORNEYS Nov. 11, 1952
A. A. SORENSON
2,617,332
HOBBING ATTACHMENT FOR LATHES
Filed Nov. 19, 1947
3 Sheets-Sheet 2
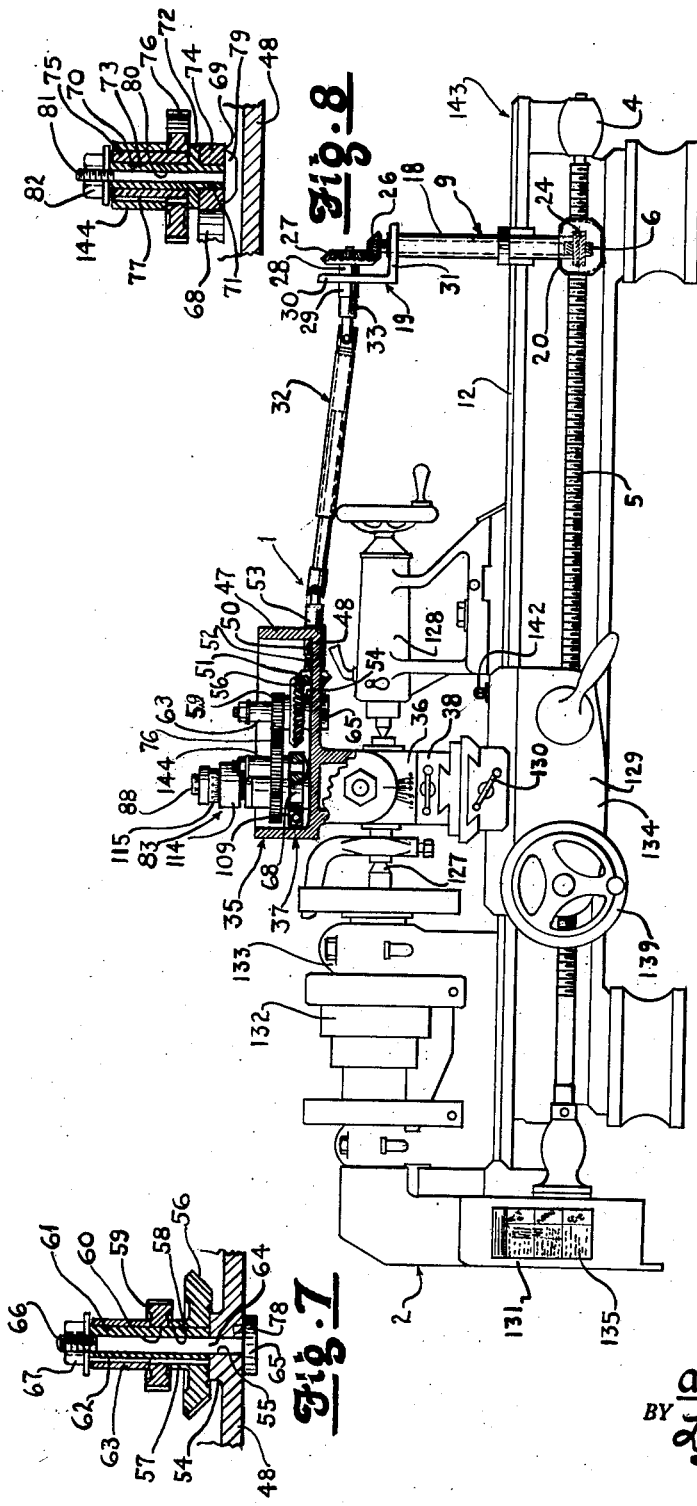
INVENTOR.
Alvin A. Sorenson
BY Lester B. Clark
& Jay L. Smith
ATTORNEYS Nov. 11, 1952          A. A. SORENSON          2,617,332
HOBBING ATTACHMENT FOR LATHES
Filed Nov. 19, 1947          3 Sheets-Sheet 3
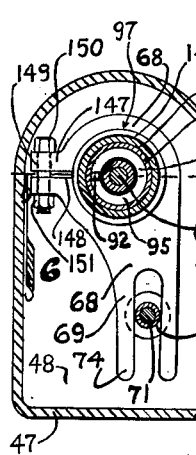
Fig. 9
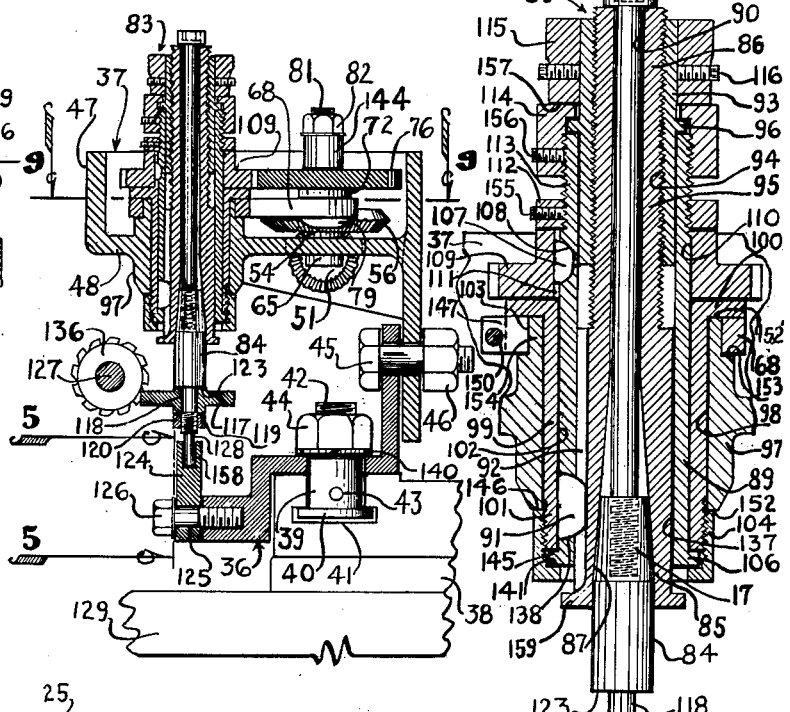
Fig. 3
Fig. 6
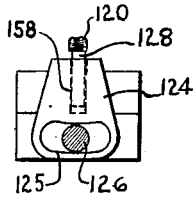
Fig. 5
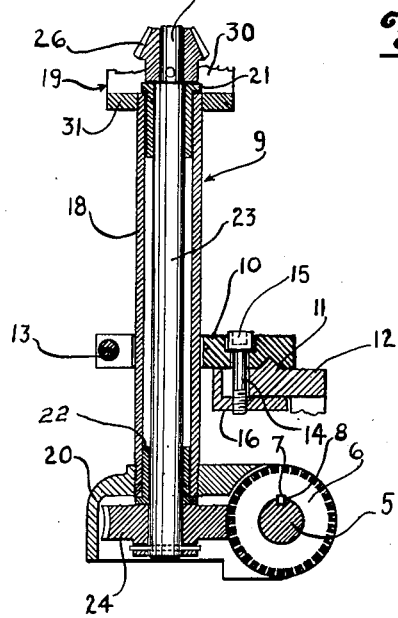
Fig. 4
INVENTOR.
Alvin A. Sorenson
BY Lester B Clark
& Ray L. Smith
ATTORNEYS Patented Nov. 11, 1952

2,617,332

UNITED STATES PATENT OFFICE 2,617,332

HOBBING ATTACHMENT FOR LATHES

Alvin A. Sorenson, St. Galena Park, Tex.

Application November 19, 1947, Serial No. 786,893

3 Claims. (Cl. 90—4)

This invention relates to a hobbing attachment for lathes and to a lathe equipped with a hobbing attachment, and it also relates to a method of rotatably mounting a gear blank on a hobbing attachment which is actuated by the lead screw of the lathe and which is mounted on a way of the lathe and on the lathe compound so that a hob mounted on the lathe spindle may cut teeth in the gear blank.

An object of this invention is to provide an easily mountable and dismountable hobbing attachment so that a standard engine lathe may be rapidly converted to hob gear teeth.

Another object of this invention is to provide a hobbing attachment of this kind adapted to be mounted on a standard engine lathe so that both spur gear teeth and worm gear teeth may be hobbed on the lathe.

It is also an object of this invention to provide a lathe equipped with a hobbing attachment of this kind in which the lathe prime mover drives the hobbing attachment through its lead screw while rotating a gear hobber on its spindle.

Still another object of this invention is to provide a hobbing attachment of this kind adapted to be actuated by the lead screw of a lathe while a gear hob is rotated on the lathe spindle so that the prime mover which drives the lathe also drives the complete hobbing operation.

A further object of this invention is to provide a hobbing attachment of this kind having a lead screw driven section adapted to be rigidly mounted on the way of a lathe and universally connected to a gear blank driving section which is mounted so as to pivot about a bracket section rigidly attached to the lathe compound.

Still a further object of this invention is to provide a hobbing attachment of this kind in which the gear blank driving section is pivotally mounted on a bracket section rigidly attached to the lathe compound, so that the spur gear blank may be positioned at an angle from the vertical equal to the helix angle of the hob.

Yet another object of this invention is to provide a hobbing attachment of this kind which is actuated by a lathe lead screw to rotate a worm gear blank which is fed into the worm gear hob upon the lathe spindle by means of the actuation of the lathe compound by the lathe cross-feed.

Still another object of this invention is to provide a hobbing attachment of this kind which has a lathe compound mounted driving section which rotates a spur gear blank while the lathe cross-feed moves the compound transversely so that the blank may be hobbed by a spur gear hob rotatably mounted on the lathe spindle.

A still further object of this invention is to provide a lathe equipped with a lead screw actuated hobbing attachment mounted on the lathe compound and on a way of the lathe so that a worm gear blank rotatably mounted on the attachment may be moved transversely by the actuation of the compound by the lathe cross-feed, and in this manner the gear blank may be fed into a hob rotatably mounted on the lathe spindle.

Another object of this invention is to provide a method of hobbing gears by rotating a gear hob upon the spindle of a lathe so that it hobs teeth in a gear blank rotated by a hobbing attachment which is mounted on the compound and a way of the lathe and which is actuated by the lathe lead screw.

Yet another object of this invention is to provide a method of hobbing gears by rotating a gear hob upon the spindle of a lathe so that it hobs teeth in a worm gear blank rotated by a hobbing attachment which is mounted on the compound and a way of the lathe and which is actuated by the lathe lead screw while the compound is fed transversely of the lathe bed by the lathe cross-feed.

It is a further object of this invention to provide a hobbing machine having two parallel driving axles which are driven by the same prime mover and which are interconnected at one end by a variable transmission means so that a hob rotated on one axle may cut teeth in a gear blank mounted on the adjustably positioned spindle of an attachment which is actuated by the other axle.

Another object of this invention is to provide a hobbing attachment for lathes in which the gear reduction ratio between the lead screw which actuates the attachment and the gear blank spindle of the attachment is equal to the threads per inch of the lead screw with the result that the threads per inch setting of the gear box is equal to the number of teeth which will be hobbed in the gear blank.

Broadly this invention considers providing the ordinary engine or screw cutting lathe with a hobbing attachment actuated by the lathe prime movers so that spur gears and worm gears may be hobbed thereby, and as a consequence of this invention these operations can be conducted on lathes in machine shops not equipped with hobbing machines.

Other and further objects will be apparent from the following specification considered in connection with the drawings in which:

Fig. 1 is a plan view which shows the hobbing attachment mounted on the lathe compound and on the front way of the lathe and which shows a left-hand gear hobber mounted on the lathe spindle and on the tail stock of the lathe.

Fig. 2 is an elevation of the lathe and of the hobbing attachment which shows the upper bracket section of the gear blank driving assembly partially in section, as along line 2—2 of Fig. 1.

Fig. 3 is a sectional view taken through the gear blank spindle assembly and through the mounting bracket as is indicated by line 3—3 of Fig. 1.

Fig. 4 is a sectional view of the lead screw driven section of the attachment transmission, which shows a way of the lathe and the method of attaching the transmission section to the lathe for actuation by the lead screw, as is indicated by line 4—4 of Fig. 1.

Fig. 5 is a view taken along line 5—5 of Fig. 3 which shows the guide sleeve in which the end of the gear blank spindle assembly bears, and this view also shows the method of pivotally mounting this sleeve on the lower section of the attachment bracket.

Fig. 6 is an enlarged sectional view of the upper part of the gear blank spindle assembly and of the upper bracket section taken along lines 6—6 in Figs. 1 and 9.

Fig. 7 is a sectional elevation of a part of the gear bracket driving transmission taken along line 7—7 of Fig. 1.

Fig. 8 is a sectional elevation of the idler portion of the gear blank driving section taken along line 8—8 of Fig. 1.

Fig. 9 is a sectional plan view taken along line 9—9 of Fig. 3 to show the web plate of the gear blank driving section of the attachment.

The hobbing attachment 1 is mounted on the lathe 2 in the following manner. The cap screws 3, shown in Fig. 1, at the rear end of the lathe, are unscrewed to permit the bracket 4 to be taken off of the lathe lead screw 5 so that the helical gear 6, may be slid along the lead screw key-way 8 to a predetermined position near the rear end of the lathe, and then keyed thereon by means of the key 7. Then the bracket 4 is replaced on the lead screw 5 and the cap screws 3 are tightened again.

The lead screw driven section 9 has a sleeve 18 which is rigidly fixed at its upper end to the horizontal leg 31 of an angle bracket 19, and this sleeve also has a housing 20 threaded on the lower end thereof. The sleeve also has flanged bearings 21 and 22 press fitted into the upper and lower sleeve ends, respectively. A shaft 23, having a helical gear 24 pinned to the lower end thereof, and having a turned down upper end 25, is installed to extend upwardly into and through the sleeve 18 and the flanged bearings 21 and 22 therein. When the bevel pinion 26 is pinned to the turned down shaft section 25 so that the face of the pinion hub is at a distance permitting a rotatable contact with the flange of the flanged bearing 21, then the shaft 23 and the sleeve 18 have been assembled.

A split bracket plate 10 having a V-slot 11 is then tightened around the sleeve 18 by tightening a nut, not shown, on the bolt 13. The lead screw driven section 9 is then located so that the helical gear 24 is meshed with the helical gear 6 which has been located on the lead screw 5, and so that the V-slot 11 of the bracket plate 10 rests on top of the front way 12. Then a socket wrench is placed in the head 15 of the bolt 14 and it is rotated so that the gib 16 is moved upwardly to bind the way 12 between the gib 16 and the V-slot 11.

The lead screw driven section 9 also has a bevel gear 27 having a hub 28 which is keyed and pinned to a shaft, not shown. This shaft extends through a boss 29 which is integral with the vertical leg 30 of the angle bracket 19, and when this shaft is pinned to the end member 33 of a universal connection assembly 32, the lead screw driven assembly is completed.

The universal connection assembly 32 disclosed in Figs. 1 and 2 of the drawings is of the well known sleeve type construction. However any type of universal connection may be employed, within the scope of this invention, which will universally and adjustably translate the rotation of the lead screw driven section 9 to the initial transmission element of an adjacent assembly.

The gear blank driving section 34 of the hobbing attachment 1 has a mounting bracket 35 comprising two sections, a lower, fixed bracket section 36 and an upper, pivotal bracket section 37. The lower bracket section 36 is positioned on the lathe compound 38 by means of a special bolt 39 which has a head 40 adapted to slide in the T-slot 41 of the compound. The bolt has an end 42 which is turned down and threaded. A pin, not shown, is then inserted through the T-slot 41 and into the pin hole 43, so that the bolt cannot rotate while the nut 44 and the lock washer 140 are being firmly screwed on bolt end 42 to bind the lower bracket section 36 against the lathe compound 38.

The upper pivoted bracket section 37 is fixed to the lower bracket section 36 by means of the single bolt 45 and nut 46, so that when the nut is loosened, the upper bracket section may be pivoted to the desired angle, and then the nut 46 may be tightened again to bind the surfaces of the two bracket sections together.

The upper bracket section 37 has a housing wall 47 and a base 48 having a slot 49 therein. It also has a cylindrical boss 50 with axis perpendicular to the housing wall, and this boss is cast integrally with the base, and with the housing wall at an end thereof.

A bevel pinion 51 having a hub 52 is keyed and pinned to a shaft, not shown, so that the pinion 51 may be located in the slot 49 and so that the shaft extends through the boss 50. When the end member 53 of the universal connection assembly 32 is pinned to this shaft, not shown, so that the face of the pinion hub 52 is in rotatable contact with the inner face of the boss 50, and the outer face of the end member 53 is in rotatable contact with the outer face of the boss 50, the connection of gear blank driving section 34 with universal connection assembly 32 is accomplished.

In a similar manner, when the shaft, not shown, which is keyed and pinned to the bevel gear 27, has been pinned to the end member 33 of the universal connection assembly 32, so that the face of the gear hub 28 is in rotatable contact with the inner face of the boss 29, and the outer face of the end member 33 is in rotatable contact with the outer face of the boss 29, the connection of the lead screw driven section with universal connection assembly 32 is accomplished. It follows that when both end members 33 and 53 of the universal connection assembly 32 have been connected to the transmission elements adjacent thereto, the two transmission sections of the hobbing attachment 1 are universally connected.

The base 48 of the upper bracket section 37 has a boss 54 cast integrally therewith, and this boss has a central bore 55 therethrough. A bevel gear 56 having a hub 57 and a central bore 58 is provided and also a spur pinion 59 having a central bore 60 therethrough. The bevel gear 56 is firmly keyed to a sleeve 61 so that the face of the gear is coterminous with an end of the sleeve. The spur pinion 59 is also slidably keyed to the sleeve 61 so that the lower face thereof is in rotatable contact with the face of the hub 57 of the bevel gear 56. The sleeve 61 is longer than the hub length of the bevel gear and spur pinion and has a key-way 62 the entire length thereof so that an additional gear may be mounted thereon as will be hereinafter described. A spacer 63 is inserted over the top of sleeve 61 to rest on the upper face of spur pinion 59 and this spacer extends just short of the top of the sleeve. A pin 64 is inserted upwardly through and press fitted in the boss 54, and this pin passes through the bevel gear 56, the spur gear 59, and the sleeve 61. This pin 64 has a threaded end section 66 so that a nut 67 may be threaded thereon to constrain the gear, the pinion, and the sleeve in assembled relationship. A dowel 73 is pressed through the pin head 65 into the base 48 to prevent possible rotation of the pin.

A web plate 68 having a forked arm 69 as an integral part thereof is installed to extend parallel with the base 48. A special stud 70 having as integral parts thereof an end section 71, a flanged section 72, and body section 73, is inserted so that the end section 71 fits between the prongs 74 of the forked arm 69 so that the flanged section 72 shoulders on the top surface of the arm. A sleeve 75 is rotatably fitted over stud body 73 and has an idler spur gear 76 keyed thereto. A key-way 77 extends for the whole length of the sleeve to receive a gear which may be installed thereon as will be hereinafter described. In ordinary operation a spacer 144 is inserted over the sleeve 75, and extends in assembly just short of the sleeve top.

The stud body section 73 extends slightly above the upper end of spacer 144. When bolt 79 is inserted through stud bore 80 and when the nut 82 is tightened on the threaded end 81 of the bolt 79, then the stud 70, the web plate 68, and the sleeve 75 having the idler spur gear 76 thereon, are in assembled relationship. The prongs 74 of the forked arm 69 are spaced apart a distance slightly greater than the diameter of the stud end section 71 to permit the stud to be easily inserted between the prongs and positioned along the arm 69. This will permit the idler spur gear 76 to be meshed with the spur pinion 59 and also with transmission elements to be hereinafter described.

The gear blank spindle assembly 83 can be best described by the steps entering into its assembly. The tapered section 85 of the tapered shank 84 is inserted into the tapered bore section 87 of the spindle bolt 86. The hollow headed tie bolt 88 is then inserted through the spindle bolt bore 90 so that the end 17 thereof may be threaded into the tapered shank 84 so as to firmly bind the shank in the bore section 87. The assembled spindle bolt 86, shank 84, and tie bolt 88 are then inserted into the bore 137 of the sleeve 89 and the Woodruff key 91 is inserted through a slot 138 in the wall of the sleeve 89 to extend into keyway 92 in the spindle bolt 86 with the result that sleeve and nut are keyed together.

A collared sleeve 93, which has an internally threaded bore 94, is then threaded over the externally threaded, turned down section 95 of the spindle bolt 86 until the collar 96 thereof comes into contact with the end face of the sleeve 89.

The base 48 has a boss 97 cast integrally therewith which extends above and below the base and terminates in an upper end face 152' and a lower end face 152. The boss 97 has a central bore 98 therethrough, and the upper end section 154 is turned down to form shoulder 153.

When the stud end 71 is located between the prongs 74, the upper end section 154 of boss 97 is extended through the web plate bore 103, and the plate 68 rests on the shoulder 153. The web plate 68 has a lug 147 with a slot 148 ending in bore 103 and the lug has holes 149 drilled therethrough. When bolt 150 is inserted through the holes 149 and the nut 151 is tightened thereon, the web plate 68 and boss 97 are bound together.

A bushing 99 having a bore 102, a flanged end 100, and a threaded end 101 having an end face 145 is inserted over the partial assembly so that the end face rests on the flange 106 of the sleeve 89. A constraining nut 104 is then threaded over end 101 until the inner face 141 of the nut contacts the flange 106, and the nut is further threaded on until the end face 146 of the nut 104 contacts the end face 152 of the boss 97. When this occurs the flange 100 constrains the web plate 68 against vertical movement and the bushing 99, web plate 68, base 48, sleeve 89, and the nut 104 are assembled, the flange 106 being rotatably constrained between nut 104 and end face 145 of bushing 99. Woodruff key 107 is then inserted in key slot 108 in sleeve 89, and then the spur gear 109 having key-way 111 in its bore 110, is slid downwardly over key 107 so that it is keyed to the sleeve 89. The annular nut 112 is then threaded over the threaded end 113 of sleeve 89 and is vertically fixed to the sleeve by a set screw 155, to position spur gear 109 to be meshed with idler spur gear 76. Then a retaining nut 114 is inserted over collared sleeve 93 and threaded over end 113 and is vertically fixed to the sleeve by set screw 156 to rotatably constrain collar 96 between sleeve and nut. A micrometer 115, is then inserted over sleeve 93 and positioned thereon by set screws 116 so that the lower micrometer face 157 rests on the top of the retaining nut 114.

The gear blank 117 to be hobbed is now mounted on arbor 118 of tapered shank 84 and nut 119 is threaded onto threaded arbor section 120 to bind the blank against the shank face 123 so as to secure it against rotation about the arbor. The arbor terminates in a turned down guide section 128 which is slidably and rotatably fitted in bore 158 of guide sleeve 124 to steady the spindle assembly 83.

The guide sleeve 124 has an arcuate slot 125 in the lower part thereof so that when the upper bracket section 37 is pivoted about the lower bracket section 36, the slot 125 permits the guide sleeve 124 to slide along the bolt 126 to the desired position. Then the bolt is threaded into the lower bracket section 36 to bind the sleeve 124 against the bracket section.

The drawings of this invention disclose a medium or small size engine, or screw cutting lathe 2, and in the ordinary usage of this lathe, stock in which screw threads are to be cut is rotatably mounted on the lathe spindle 127 and centered by the tail stock 128. A cutting tool, not shown, is rigidly mounted on the compound rest or compound 38, and the compound in turn is connected to the carriage 129 which is adapted to be moved by the lead screw to travel up and down the ways 12 of the lathe 2 so that the cutting tool travels parallel with the lathe spindle axis. The compound is also adapted to be moved transversely of the lathe bed by the manual rotation of the cross-feed handle 130, or by transmission means, not shown.

A single prime mover drives the lathe spindle 127, and also drives the lead screw 5 by means of a system of gears termed the gear box transmission, located in the gear box 131. In the drawings a cone pulley 132, driven by a prime mover, not shown, is located in the head 133 of the lathe to directly drive the lathe spindle 127, and to drive the lead screw 5 by means of the gear box transmission. Alternatively, the prime mover can be a motor which is located in the head 133 of the lathe in place of the cone pulley 132.

The rotation of the lead screw 5 is translated into longitudinal motion of the lathe carriage 129 by a well known means, not shown, within the carriage apron 134, and this means is spline connected to the lead screw 5 at the key-way 7. Consequently, the carriage 129 will travel 1" along the ways 12 while the lead screw rotates a number of times corresponding with its threading per inch, which is 8 in lathes of the type disclosed.

It then follows that in order to cut any desired number of threads per inch on stock rotated on the lathe spindle 127, as for instance 12 threads per inch, the gears within the gear box 131 must be so selected and intermeshed as to give the necessary ratio between spindle speed and lead screw speed. For example, this ratio would be 12 to 8, or 3 to 2, in the case selected. In order to obviate calculations, a plaque 135 on the gear box 131 of every lathe indexes the gear combinations which will result in cutting various threads per inch on stock rotated in the lathe spindle 127.

In adapting an engine or screw cutting lathe to the application of this invention it has been found practical to rotate the gear blank 117 one time while the lead screw 5 rotates a number of times equivalent to its threading per inch, or 8 times in the type of lathe shown. This is accomplished by three gear reductions of 2 to 1 attained between bevel pinion 26 and bevel gear 27, between bevel pinion 51 and bevel gear 56, and between spur pinion 59 and (idler spur gear 76) spur gear 109.

In the application of this invention, by virtue of the gear reduction between lead screw and gear blank 117, the operator may select any gear combination listed on the plaque 135, and the number of threads per inch indexed to correspond with this setting indicates to him, not threads per inch, but the number of teeth which such gear selection will enable a hob 136, rotated on the lathe spindle 127, to hob in a gear blank 117 rotated on the gear blank spindle assembly 83. This is obvious, since the hob 136 will be rotated a number of times corresponding with the threads per inch indicated while the gear blank is rotated one revolution.

To apply this invention to the hobbing of spur gear teeth in a gear blank, the operator selects a gear blank 117 of an outer diameter to correspond with the pitch diameter designated, and mounts this blank on the arbor 118 of the gear blank spindle assembly 83. He then selects a hob, as the left hand hob 136 shown in the drawings, which will mill to the desired pitch, and mounts this on the lathe spindle 127 and centers it by means of the tail stock 128. He then makes that combination of gears within the gear box 131 which corresponds to a number in the threads per inch index on the plaque 135 which is equal to the number of teeth he desires to hob in the gear blank 117.

The gear blank 117 is then brought into approximate operating position opposite the hob 136 by rotating the apron hand wheel 139 to move the carriage 129 along the ways 12. The sleeve type universal connection assembly 32 compensates for such motion between the lead screw driven section 9 and the gear blank driving section 34. The carriage 129 is then locked into position by means of the carriage lock screw 142.

The upper bracket section 37 is then pivoted about the bolt 45 to bring the axis of the gear blank spindle assembly 83 at an angle to the vertical equal to the helix angle of the hob 136. At the same time the guide sleeve 124, by means of the arcuate slot 125 therein, is pivoted accordingly. Then the upper bracket section 37 and the sleeve 124 are bound by surface contact against the lower bracket section 36 as has been hereinbefore described. The angle at which the upper bracket section 37 is to be pivoted is indicated to the operator by the graduated index on the lower bracket section 36, as shown in Fig. 2.

The cross-feed handle 130 is then turned to move the compound 38 transversely of the lathe bed 143 while at the same time the micrometer 115 of the gear blank spindle assembly 83 is turned to move the gear blank 117 to the proper position in a vertical plane. The compound 38 is then secured to the carriage 129 to prevent further transverse motion.

When this has been done the lathe prime mover is started up to drive both the lathe spindle 127 and the lead screw 5, which in turn actuates the hobbing attachment 1 to rotate the gear blank 117, while the carriage 129 remains stationary. Then the hob 136, when rotated, cuts away the stock from the periphery of the gear blank 117 to generate spur gear teeth therein.

During the progress of generating the teeth it is necessary to feed the gear blank 117 axially so that the hob may remove the full amount of metal from between the teeth. This is accomplished by turning the micrometer 115 which is fixed, by set screw 116, to the collared sleeve 93. Since the collar 96 is rotatably constrained between retaining nut 114 and the upper end of sleeve 89, and since the internally threaded bore 94 of the collared sleeve 93 is finely threaded over the externally threaded section 95 of the spindle bolt 86, the turning of the micrometer 115 results in axial travel of the assembled shank 84, bolt 86, and bolt 88, which in turn causes the gear blank 117 on the shank arbor 110 to move axially in fine increments per rotation of the micrometer.

In operation it is practical to start with the gear blank 117 in such a position that the hobber first begins cutting away the metal between the upper parts of the teeth, so that during the hobbing operation the micrometer is turned in a direction to move the gear blank axially upward so that the hob may cut away the metal between the lower parts of the teeth. It is also necessary during the operation to turn the cross-feed handle 130 to move the compound 38 and feed the gear blank 117 in toward the hob so that metal may be removed to the full depth of the teeth.

In this invention the hobbing of worm gear teeth on gear blanks is very similar to the hobbing of spur gear teeth as regards the adjustment of the worm gear blank spindle assembly, with the exception that the axis of the gear blank spindle assembly 83 does not have to be tilted at an angle to the vertical. Fig. 2 consequently shows the lower bracket section 36 and the upper bracket section 37 in proper adjustment for hobbing a worm gear blank, which is indicated by coincidence of the index mark on the upper bracket section 37 with the zero graduation on the lower bracket section 36.

After the lathe prime mover is started, the same operations are employed in the hobbing of worm gears as in the hobbing of spur gears as regards axial adjustment and cross-feeding. This method is a reversal, in effect, of the infeed method by which worm gear teeth are generated on hobbing machines.

Fig. 1 shows a left hand hob 136 mounted on the lathe spindle 127 and it is pointed out that the direction in which the micrometer 115 is turned depends upon the hand of that particular hob which the operator may be using. The standard hobs used are made left hand or right hand to cut helical gears on hobbing machines, and although the hand of the hob does not enter into the cutting of spur and worm gear teeth, this has to be considered to insure the proper direction of rotation of the elements of this invention.

Assuming the spindle bolt 86 and the collared sleeve 93 to be threaded with the standard right hand thread, and the lead screw 5 to be rotating counter-clockwise, then it is necessary to turn the micrometer in a clockwise direction at a speed faster than gear blank spindle assembly speed in order to move the gear blank 117 axially upward, as the spindle assembly 83 is rotating in a clock-wise direction as viewed in Fig. 2. It should be noted that the contact of flange 159 of spindle bolt 86 with flange 106 of sleeve 89 limits upward motion of the gear blank.

For a right handed hobbing operation the rotation of the lead screw 5 and likewise of the spindle assembly 83 will be reversed, and consequently when the micrometer 115 is held against rotation, the spindle nut threads itself axially upward through the collared sleeve 93.

At this point it should be noted that the axial adjustment of the gear blank 117 can be conducted while the blank is being rotatably driven due to the intermeshing of the idler spur gear 76 with the spur gear 109 of the gear blank spindle assembly 83. This is possible since the adjustment amounts to such an incremental sliding of the gear blank along the hobbing teeth face as not to interfere with the rotation of either element.

It should also be noted that it is practical but not necessary to have the gear reduction ratio of the attachment 1 equal to the threads per inch of the lead screw 5, since in any case the gear box transmission selections are indicated according to the following formula:

$$\text{Teeth to be hobbed} \times \frac{\text{Gear reduction ratio of attachment}}{\text{Threads per inch of lead screw}} = \frac{\text{Threads per inch reading on plaque of gear box}}{}$$

When the gear reduction ratio of attachment equals the threads per inch of the lead screw, the multiplier in the formula, being 1, drops out, and in such a case the operator, without making any calculation, makes his gear selection to correspond with that threads per inch reading of the plaque which is equal to the number of teeth to be hobbed. In other cases, calculations are required in that the operator must multiply the teeth to be hobbed by the multiplier, or constant of the formula.

Gears having a number of teeth not ordinarily encountered may be hobbed by the attachment by compounding the gear train thereof to obtain a multiplier which will give one of the indexed threads per inch plaque readings. This can be done by intermeshing a substituted spur gear and pinion combination. One unit of this combination may be keyed to idler sleeve 75 above idler spur gear 76 and in place of spacer 144. The other unit may be keyed on sleeve 61 above a spacer which has been substituted for spur pinion 59 after this spur pinion 59 and the spacer 63 have been removed.

The axial adjustment of the gear blank 117, which is done by the manual turning of the micrometer 115, may also be made automatic. This may be done by extending the length of idler sleeve 75 so that a gear may be mounted thereon, and meshed with a gear integral with the micrometer 115. This may also be accomplished by other well known means, as by installing lugs to radially extend from the micrometer periphery to be rotatably actuated by a vertical post extending upward from the face of an eccentric rotatable with idler sleeve 75.

It is pointed out that the attachment of this invention need not be limited to lathes, but that the method of using the attachment and the structure thereof may be used with, or as an integral part of any machine having two parallel driving axes driven by the same prime mover and interconnected by a variable transmission, and also having a transversely and longitudinally movable base on which the gear blank driving section of the attachment may be mounted.

Changes and variations may be made in the design, proportions, arrangements, location, and numbers of parts which a skilled mechanic might employ in practicing this invention, the scope of which consists of any combination of structures and of any method of positioning a gear blank, and of rotating a gear blank through the actuation of the lead screw, so that teeth may be hobbed in the gear blank by a hobber rotated on the lathe spindle.

What is claimed is:

1. A hobbing attachment spindle assembly comprising, micrometer means having a collar and a threaded bore, driven geared means adapted to rotate in a bushing rigid with the attachment, said geared means having a flanged end, a groove in said geared means, a spindle having a threaded bore, means in said spindle for mounting a gear blank thereon, means connecting said spindle and geared means, a nut threadable over said bushing to rotatably constrain said flanged end between bushing and nut, said collar being constrained for rotation in said groove so that the micrometer may be turned to adjust the spindle axially while the driven geared means rotates the gear blank.

2. A hobbing attachment spindle assembly comprising, micrometer means having a collar and a threaded bore, driven geared means adapted to rotate in a bushing rigid with the attachment, a groove in said geared means, a spindle having a threaded bore, means in said spindle for mounting a gear blank thereon, means connecting said spindle and geared means, said collar being constrained for rotation in said groove so that the micrometer may be turned to adjust the spindle axially while the driven geared means rotates the gear blank.

3. With a lathe having a rotatable prime mover on one end thereof, a rotatable spindle thereon including means to receive one end of a gear hob and to support said hob for rotation therewith, means connecting said spindle to be driven by said prime mover, a gear transmission mounted on said one lathe end adjacent said prime mover and connected to be driven thereby, a lead screw with ends pivotally journalled in the ends of said lathe and with axis parallel to the axis of said spindle, means connecting said gear transmission to rotate said lead screw, a tailstock member slidably mounted upon said lathe and movable away from and toward said spindle to within close proximity thereof to provide a bearing in which the other end of said gear hob may rotate, the combination of, a device comprising, a first shaft having a helical gear on one end thereof and a first pinion on the other end thereof and mounted to mesh said helical gear with said lead screw adjacent the other end of said lathe, a first transmission means mounted to mesh at one end with said first pinion, a second shaft including means for connecting a gear blank to one end thereof to rotate therewith, means mounting said second shaft on said lathe and movable with relation to said lathe to position said gear blank to be contacted by said hob, said mounting means also including means to set said shaft at a predetermined angle to the axis of said spindle corresponding with the helix angle of said gear hob, a second pinion on the other end of said second shaft, a second transmission supported by said mounting means to mesh at one end with said second pinion, a substantially straight extending assembly comprising a plurality of inter-telescoping tubes, axially slidable driving connection means between said tubes, and a pivotal connection between one end of said assembly and said first transmission and between the other end of said assembly and said second transmission, said prime mover thereby driving said gear hob through said spindle and said gear blank through said gear transmission, said lead screw, and said device.

ALVIN A. SORENSON.

REFERENCES CITED

The following references are of record in the file of this patent:

UNITED STATES PATENTS

| Number | Name | Date |
| --- | --- | --- |
| 804,575 | Boisard | Nov. 14, 1905 |
| 992,843 | Berold | May 23, 1911 |
| 1,024,254 | Garrett | Apr. 23, 1912 |
| 1,397,372 | Garrett | Nov. 15, 1921 |

FOREIGN PATENTS

| Number | Country | Date |
| --- | --- | --- |
| 378,742 | Germany | July 30, 1923 |
| 387,848 | France | May 16, 1908 |
| 541,485 | France | May 3, 1922 |